Feb. 18, 1947. J. F. JOY 2,415,888
SEALING DEVICE
Filed April 21, 1943 4 Sheets-Sheet 1

Inventor
Joseph F. Joy

Feb. 18, 1947.  J. F. JOY  2,415,888
SEALING DEVICE
Filed April 21, 1943  4 Sheets-Sheet 2

Inventor
Joseph F. Joy
By C. E. Kerrstrom & H. E. Thibodeau
Attorneys

Feb. 18, 1947.  J. F. JOY  2,415,888
SEALING DEVICE
Filed April 21, 1943  4 Sheets-Sheet 3

Inventor
Joseph F. Joy
By C. E. Harrstrom & A. E. Thibodeau
Attorneys

Feb. 18, 1947. J. F. JOY 2,415,888
SEALING DEVICE
Filed April 21, 1943 4 Sheets-Sheet 4

Inventor
Joseph F. Joy
By C. E. Herrstrom & H. E. Thibodeau
Attorneys

UNITED STATES PATENT OFFICE 2,415,888

SEALING DEVICE

Joseph F. Joy, Washington, D. C.

Application April 21, 1943, Serial No. 483,840

9 Claims. (Cl. 288—3)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in sealing elements of the type embodying a rigid mounting base or support in combination with a resilient wiping and searching element, which element prevents the flow of fluid between moving and stationary parts of mechanisms associated with vehicles and particularly military vehicles, such as army tanks and artillery carriages.

Equipment of this nature under the stress of battle conditions is subjected to a service of such severity as to frequently exceed the endurance capacity of seals commonly used heretofore. Such common seals as have been used in the past usually consist of a garter or finger spring, a loaded flexible member contacting the moving element of the journal and encased within a pressed steel or other metal container. The flexible member is usually of leather or other similar material incapable of withstanding the high contact speeds imposed upon them in the class of service above mentioned. As a result, it frequently happens that the sealing lips are rapidly worn away, allowing the garter springs to make contact with and score the rotating part to such a degree as to preclude effective sealing, even through the replacement of seals which have thus become defective.

To overcome this defect, it has been the practice to harden the shaft or journal surfaces at the point of seal contact. While this measure is effective to a certain degree, it does not entirely overcome the wear of such parts and when such wear does occur, the entire rotating part as well as the seal itself must be replaced.

It has been found further that conventional seals require precision machining of parts for the securement of effective sealing and no provisions have been made for misalignment of parts such as must always be expected when the mechanisms are subjected to the severe service of battle conditions.

Having the foregoing in mind then, one of the objects of the present invention is to provide a seal of more simple, effective and practical construction capable of withstanding the severe operating conditions imposed by modern high-speed mechanism.

Another object of the invention is to provide a device which will have an effective sealing effect even though the parts may be out of alignment to a limited extent.

A further object of the invention is to provide means for the renewal of the sealing face as well as that of the seal itself.

Still another object of the invention is to provide a seal of a general character which will effectively perform its function between stationary and rotating or reciprocating parts to thus prevent the passage of fluid either in the presence or absence of high pressure.

A still further and more specific object of the invention is to provide a seal having a rigid metallic base or supporting member to which is secured a flexible member wherein the sealing wall thereof is normally angularly disposed but which will be moved to parallelism when the seal is inserted in a cavity.

Another object of the invention is to provide for a standardization of seals and sealing faces of such a character that they may be produced in large quantities of standardized dimensions.

Other objects and purposes of the invention will become apparent upon a reading of the following description taken in connection with the accompanying drawings showing preferred embodiments of the invention, wherein.

For purposes of convenience in understanding the various forms of the invention disclosed herein together with the practical applications thereof, the figures of the drawings have been divided into groups, each of which will be discussed and described separately. The first group includes Figs. 1 through 9, group 2 includes Figs. 10 through 15, group 3 includes Figs. 16 through 21, group 4 includes Figs. 22 through 24, group 5 includes Figs. 25 through 27, and group 6 includes Figs. 28 through 31.

Figure 1:
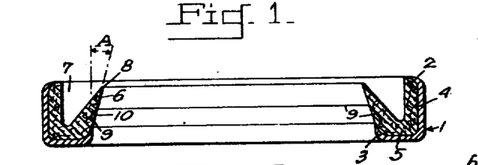
Fig. 1 is a transverse sectional view of a sealing device intended to be used for fixed mounting at its outer circumference and provided with sealing lips at its inner circumference for contact with a journal or shaft where relative movement occurs between a journal and its enclosure.

Referring now more particularly to the drawings and especially to group 1, which includes Figs. 1 through 9, it will be observed that the rigid supporting base of the seal of Fig. 1, which is preferably, though not necessarily, formed of metal, is indicated by the numeral 1. This seal is intended to have a tight fit within a cavity and thus be secured or fixed at its outer circumference. This supporting member 1 is preferably formed of pressed steel and has two sides positioned at substantially right angles to each other, one of which terminates in an inwardly turned lip 2 and the other likewise terminates in an inwardly turned lip 3. A flexible ring member is positioned within the sides of the metal supporting ring and is vulcanized or otherwise secured thereto at two of its sides indicated by the numerals 4 and 5.

Where the rigid support is adapted to be secured or fixed in place on its outer circumference, the resilient sealing member is provided with an inwardly extending sealing face 6 which is spaced from the wall 4 by means of an annular groove 7. The edge of the sealing face or wall 6 terminates in a flexible sealing lip 8. I then preferably place an annular slit 9 in the sealing wall 6 to thus divide the wall into separate sealing lips 8 and 10. It is to be noted that the sealing wall is inclined inwardly in its normal position so that it forms the angle A with the axis of the shaft around which it is placed as shown in Fig. 1.

Figure 2:
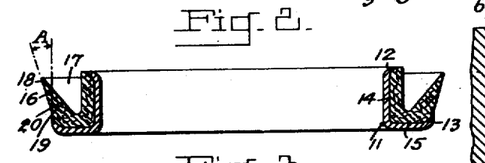
Fig. 2 is a transverse sectional view of a sealing device similar to Fig. 1 but arranged for fixed mounting on its inner circumference and provided with sealing lips at its outer circumference.

Referring now particularly to Fig. 2, it will be noted that this form of sealing ring is similar to that shown in Fig. 1, except that the ring is intended to be fixed on its inner circumference. In this form of the invention, the rigid supporting ring 11 is provided with two walls at substantially right angles to each other, one of which terminates in an outwardly extending lip 12 and the other in an inwardly extending lip 13. In this case, the flexible sealing member is placed around the outside of the support and is vulcanized or otherwise secured thereto at its faces 14 and 15. The outer circumference of the ring is then provided with a flexible outwardly inclined sealing face 16 which is spaced from the wall 14 by means of an annular groove 17. The sealing face terminates in a flexible sealing lip 18 and is preferably provided with an annular slit 19 to provide a supplemental or auxiliary sealing lip 20.

Figure 3:
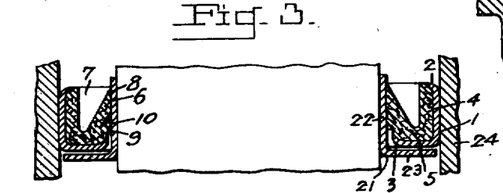
Fig. 3 is a fragmentary transverse sectional view of the type of sealing ring shown in Fig. 1 in combination with a hardened renewable wearing member.
Figure 4:
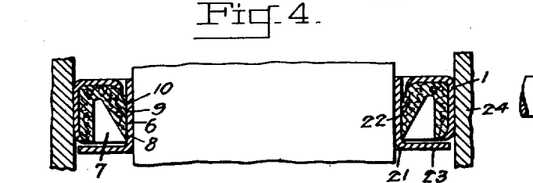
Fig. 4 is a view similar to Fig. 3, but showing the sealing member introduced into the retaining cavity in the opposite direction.

Figs. 3 and 4 show the use of the seal of Fig. 1 in combination with a special hardened renewable wearing member or ring 21 having faces or walls 22 and 23 extending at right angles to each other. The face 22 is adapted to fit tightly around a journal or shaft which has an enclosing member 24 spaced therefrom to provide a retaining cavity for the seal. As shown, the seal is inserted within the cavity so that the outer face of the support 1 will be pressed tightly against the inner face of the member 24, thus preventing the seal from rotating. The flexible sealing lips 8 and 18 on the inner circumference of the seal bear against the wall 22 of the replaceable wearing member. It will be noted that, when the seal is thus inserted within the cavity, the two sealing lips 8 and 18 spread apart when their innermost portions engage the wall 22. Any fluid attempting to escape longitudinally of the shaft around which the ring 21 is placed will first fill the enlarged slit 9 and thus force the lip 18 against the wearing member. It will be clear when the sealing ring is thus applied to the replaceable wearing member 21, when this wearing member becomes worn, it will be unnecessary to replace the entire shaft. The seal and its wearing member can be easily replaced even out in the field.

In Fig. 4, the sealing ring has been shown inserted in the cavity between the face 22 of the wearing member and the outer member 24 in a direction opposite to that shown in Fig. 3. However, in this instance, the fluid will be prevented from flowing in the opposite direction; that is to say, that the fluid when passing along the shaft will always first become lodged in the annular groove adjacent the sealing lips, otherwise the two structures are the same.

Figure 5:
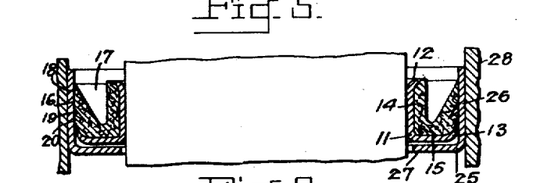
Fig. 5 is a fragmentary sectional view showing the type of sealing ring disclosed in Fig. 2 in association with a hardened renewable wearing member.

Fig. 5 shows the sealing ring of Fig. 2 in association with a renewable wearing plate. In this embodiment the sealing ring with its rigid support 11 will be mounted securely upon the rotating shaft and will rotate with it. A wearing member 25 will have been previously inserted in the mechanism, whereby the inner periphery of the portion 26 thereof will have the flexible sealing lips of the seal pressed thereagainst. The wearing member is flanged inwardly at one side as shown at 27, and is placed within an annular cavity formed around the shaft by reason of a member 28. The wearing plate is first inserted within the cavity and has a tight fit against the inner surface of the member 28. The sealing member is then placed on the shaft and fixed thereto by reason of a tight fit so that the sealing lips 18 and 20 on the outer periphery thereof will bear against the face 26 of the wearing member. Here again the outer wall of the seal will be pressed against the wearing member to such an extent that the slit 19 will cause a separation of the sealing lips 18 and 20. The manner in which the seal operates is similar to that described above with respect to Figs. 3 and 4, except that in Fig. 5, the seal rotates with the shaft, whereas in Figs. 3 and 4, the seal is stationary and the wearing member rotates with the shaft.

Figure 6:
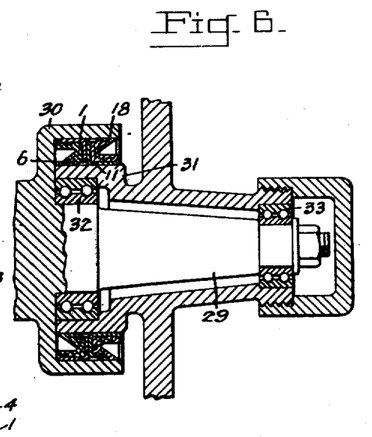
Fig. 6 is a fragmentary sectional view of a mechanism commonly employed in supporting artillery wheels and the like, showing the manner in which the type of seals shown in Figs. 1 and 2 are assembled therewith.

Fig. 6 illustrates one of the many practical applications of my improved seal. In this application a shaft 29 is provided with an enclosure member 30 which is flanged as shown and is spaced from a rotatable hub 31 so as to provide an annular retaining cavity for the seals. A sealing ring of the character shown in Fig. 1 is first inserted within the cavity and will have the rigid supporting member thereof bearing securely against the inner surface of the enclosure 30. The flexible sealing wall 6 on the inner diameter of the ring will then bear against the rotating hub 31. A sealing ring like that shown in Fig. 2 is then inserted within the cavity adjacent to, and outwardly of, the first sealing ring. This ring, however, will have the rigid supporting member 11 thereof bearing securely against the rotating hub 31, while the flexible wall with its sealing lip 18 bears against the inner wall of the enclosure 30. It will thus be seen that the inner sealing ring 1 will remain stationary while the outer sealing ring 11 will rotate with the hub 31. It follows, therefore, that oil present within the casing for lubrication of bearing members 32 and 33 will be effectively retained therein and will be prevented from passing outwardly by reason of the sealing capacity of the ring 1. Likewise, the rotating sealing ring 11 will effectively prevent any foreign material such as mud, dirt, and the like from passing inwardly to within the housing.

Figure 7:
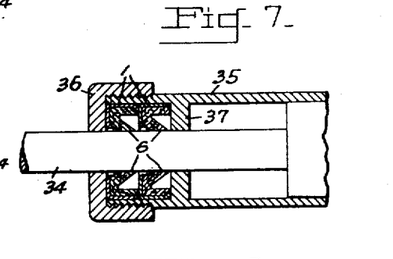
Fig. 7 is a longitudinal section through a conventional hydraulic or pneumatic cylinder, showing the piston packing box thereof employing seals of the character shown in Fig. 1, wherein they are employed for preventing flow of fluid along the piston rod from the interior to the exterior thereof.
Figure 8:
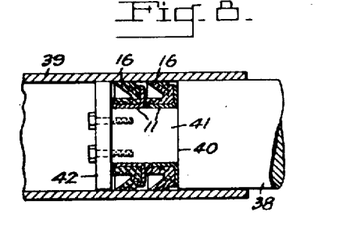
Fig. 8 is a fragmentary longitudinal section of a cylinder and piston wherein seals of the character shown in Fig. 2 may be used.
Figure 9:
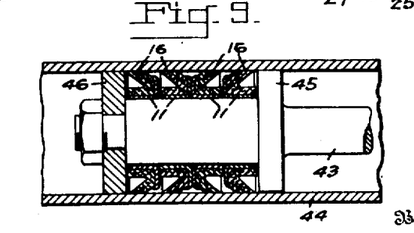
Fig. 9 is a fragmentary longitudinal section through a double acting cylinder in which the piston head is fitted with a plurality of seals of the type shown in Fig. 2, to function as a piston head packing.

Having reference now to Figs. 7, 8 and 9, these embodiments illustrate a few uses of the rings shown in Figs. 1 and 2 with respect to reciprocating mechanisms, such as pumps and the like. For example, in Fig. 7 there is shown a piston rod 34 adapted to reciprocate within a cylinder 35. The end of the cylinder is provided with a cap 36 and an inwardly extending annular flange 37 within the cylinder, spaced from the cap, provides an annular cavity within which one or more sealing rings 1 may be enclosed. Leakage of fluid within the cylinder will be effectively prevented when it reaches the sealing rings 1 located within the cylinder. The effectiveness of the rings in this application is similar to that explained above. The fluid will first become lodged in the annular groove, thus exerting pressure inwardly on the flexible sealing walls. The exact number of rings may obviously be varied and I do not intend to be limited to two of such rings as shown.

In Fig. 8, I have shown a piston rod 38 adapted to reciprocate within a cylinder 39. The inner end of the rod is provided with an annular shoulder 40 to provide a portion of smaller diameter as shown at 41. A head 42 is then secured to the end of the rod, thus providing an annular cavity for retention of one or more sealing rings, particularly of the character disclosed in Fig. 2. It will be noted in this case that the flexible sealing walls bear outwardly against the inner surface of the cylinder instead of inwardly against the piston rod as shown in Fig. 7. While the sealing members of Fig. 7 remain stationary with respect to the piston rod, those in Fig. 8 are movable therewith.

Fig. 9 shows a still further practical application of these seals with respect to reciprocating members. In this case a piston rod 43 reciprocates within a cylinder 44 and is provided at one end with a base 45. An end member 46 is spaced from the base 45 in any suitable manner as long as an annular retaining cavity is provided. In this instance I have shown four of the sealing elements of Fig. 2 inserted within the retaining cavity. However, these sealing elements are so located as to be effective in sealing when moved in both directions. That is to say, the two sealing rings at the left hand end of Fig. 9 will prevent fluid from moving toward the right, while the two sealing rings at the right hand end thereof will prevent fluid from moving toward the left.

Figure 10:
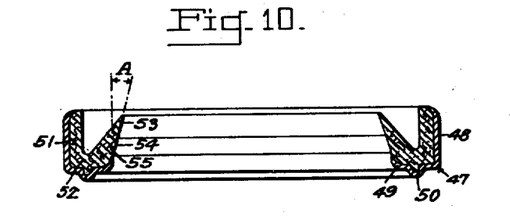
Fig. 10 is a transverse sectional view of a modified form of my invention where the rigid support is provided with a bearing surface rearwardly of the flexible sealing lips, which in this instance are on the inner circumference.

Referring now to those modified forms of the invention disclosed in Figs. 10 to 15, inclusive, and more particularly for the moment to Fig. 10, it will be here noted that sealing member 47 is made up of a rigid supporting base having an outer wall 48 and an inwardly extending flange 49 which in turn is provided with an axially extending annular rib 50. Like those seals described hereinbefore, the edges of the wall 48 and the flange are turned inwardly to receive a flexible sealing member which is vulcanized or otherwise secured thereto. The resilient portion of the seal member is similar to that shown in Fig. 1, and has substantially right angled wall members 51 and 52 which abut against and are secured to the rigid support 47. The inner sealing wall extends inwardly at substantially the same angle as shown at A and is provided with separate sealing lips 53 and 54, separated by a slit 55.

Figure 11:
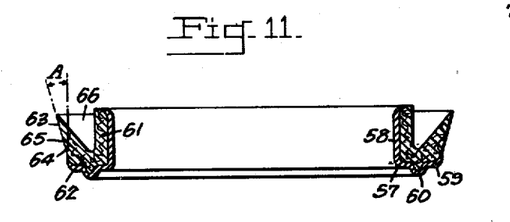
Fig. 11 is a transverse sectional view similar to Fig. 10, wherein the flexible sealing lips are on the outer circumference.

In Fig. 11 is shown a sealing member similar to Fig. 10, except that a rigid supporting base 57 supports the inner rather than the outer periphery of the resilient ring. In this form of the invention, an axially extending wall 58 has a flanged portion 59 which extends outwardly and is provided with an annular rib 60. An inner wall 61 of the resilient sealing member is secured to the wall 58 of the rigid support, while a wall 62 thereof is likewise secured to the flange 59 by vulcanizing or other desired means. The edges of the rigid support are also bent outwardly so as to aid in maintaining the resilient sealing ring in place. The outer peripheral wall of the resilient member is flared outwardly as shown by the angle A again, and has sealing lips 63 and 64 separated by an annular slit 65. The sealing wall is spaced from the wall 61 by means of an annular groove 66.

Unlike the seals explained heretofore, these are mounted generally rather loosely in the retaining cavity and the main seal is between the rib 50 in Fig. 10 and a radially extending wearing surface, or between the rib 60 in Fig. 11 and a radially extending wearing surface. In this type of seal there is a metal-to-metal contact which serves as the sealing means.

Figure 12:
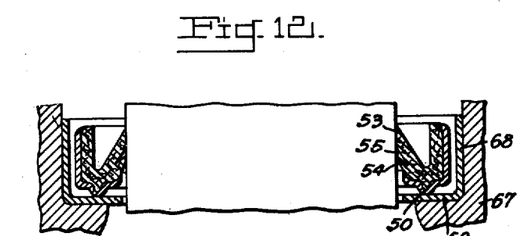
Fig. 12 is a fragmentary transverse section showing the type of sealing member shown in Fig. 10 associated with a special replaceable wearing member.

Fig. 12 illustrates the use of the type of seal shown in Figs. 10 and 11 in connection with a replaceable wearing surface. While it will be clear that devices like those in either Fig. 10 or Fig. 11 can be used in association with a replaceable wearing surface, the one shown in Fig. 12 is an application of the seal shown in Fig. 10. Herein is seen an annular member 67 surrounding a shaft, on the inner surface of which is located a replaceable wearing member having an axially extending face 68 and a radially extending face or flange 69. The face 68 bears snugly against the inner surface of the member 67 and the seal is inserted within the cavity provided therefor. The resilient sealing lips 53 and 54 bear against the shaft, while the rib 50 bears tightly against the radially extending flange 69. Fluid under pressure will tend to press the seal against the flange 69 and since the sealing ring will rotate with the shaft, a certain amount of wear will be caused as between the rib 50 and the flange 69. It will be evident that either the wearing surface or the seal or both may be easily replaced after becoming worn.

Figure 13:
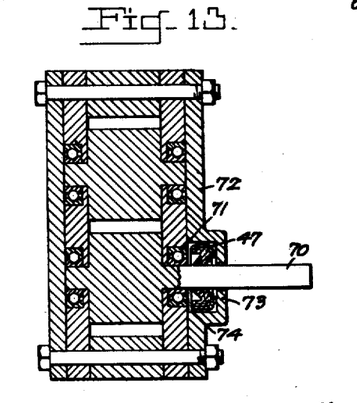
Fig. 13 is a transverse sectional view of a common gear-type hydraulic pump, showing the manner in which a seal of the type shown in Fig. 10 would be employed to overcome leakage of fluid under pressure from the inside of the pump to the exterior along its driving shaft.
Figure 14:
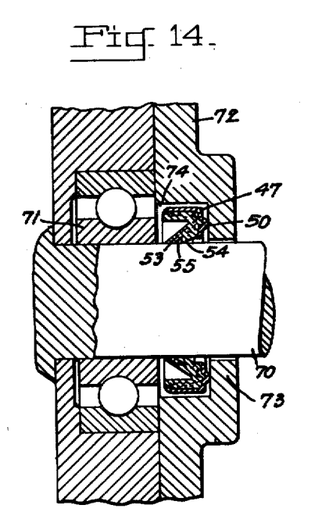
Fig. 14 is a fragmentary enlarged view of a portion of Fig. 13.
Figure 15:
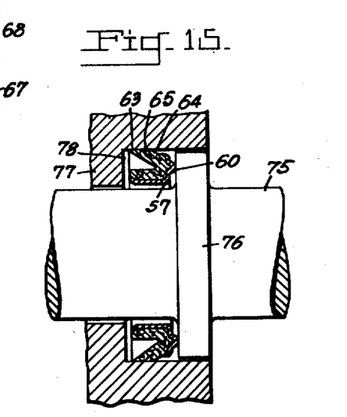
Fig. 15 is a sectional view of a device showing a typical application of the sealing member shown in Fig. 11.

Other applications of this type of seal are shown in Figs. 13, 14, and 15, to which reference will now be made. Figs. 13 and 14 disclose a common gear-type hydraulic pump having a shaft 70 thereon. A bearing 71 surrounds the shaft and is lubricated in the usual manner. Adjacent the bearing, a plate 72 having a radially inwardly extending flange 73 thereon is located and secured. This form of plate then leaves an annular cavity 74 between the flange 73 and the bearing. As stated before, this type of seal is to be used especially when dealing with fluids under pressure. The seal 47 is mounted loosely on the shaft within the cavity 74 so that when the oil or other fluid under pressure bears against the seal, it will be free to move longitudinally of the shaft so that its rib 50 will bear tightly against the inner surface of the flange 73. Likewise, the pressure of the fluid will become lodged in the annular groove adjacent the resilient sealing face and thus exert pressure against the sealing lips. This type of seal has been found very effective in preventing leakage of fluid under pressure.

Fig. 15 discloses a practical application of the type of seal shown in Fig. 11, wherein a shaft 75 is provided with an integral radially extending flange 76. A member 77 surrounds the shaft and the flange thus providing a cavity 78 within which the sealing member is to be located. Here again, the sealing ring is loosely mounted within the cavity but the resilient outer sealing face thereof, instead of bearing against the shaft will bear outwardly against the inner peripheral surface of the member 77. Here again, fluid pressure will force the sealing member to be moved longitudinally of the shaft and will cause the rib 60 thereof to bear against the flange 76, thus causing an effective seal in the same manner as explained above with respect to Fig. 14.

Reference will now be had to the third group or modified form of the invention disclosed in Figs. 16 to 21, inclusive. The seals heretofore discussed have been so designed as to have their resilient sealing walls bear radially either outwardly or inwardly against a relatively rotating or reciprocating surface. The seals, however, which will now be discussed are so formed and molded that their resilient sealing faces exert pressure in an axial direction against radially extending wearing surfaces. For example, in Fig. 16, a rigid supporting base 79 is provided with an axially extending inner wall 80 and an outwardly extending flange 81. The resilient or flexible portion of the seal is provided with two walls 82 and 83, which are secured such as by vulcanizing or in any other desired manner, to the respective wall and flange 80 and 81 of the rigid support. The resilient sealing face extends outwardly in a substantially radial direction, but is flared so as to form the angle A between a plane passing through the face and one passing perpendicularly through the shaft on which the seal is to be mounted. The sealing face is provided with a plurality of sealing lips such as 84 and 85, divided by an annular slit 86, which lips are spaced from the wall 83 by means of an annular groove 87. In this form of the invention, it will be clear that the sealing ring is to be mounted snugly on a rotating shaft to rotate therewith so that the lips 84 and 85 will seal against fluid movement by bearing against a stationary radially extending wearing surface.

Figure 17:
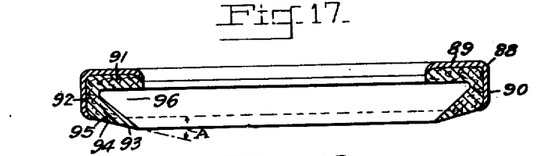
Fig. 17 is a transverse section of a seal similar to that shown in Fig. 16, wherein the rigid support is arranged to be secured on its outer circumference.

In Fig. 17, the rigid supporting ring is so designed as to fit snugly into a retaining cavity and be held stationary with respect to a rotating shaft which will have integral with, or secured thereto, a radially extending wearing surface. In this form a rigid supporting ring 88 has a radially inwardly extending face 89 and an axially extending outer face 90. The resilient or flexible portion of the ring is secured by means of its two walls 91 and 92 to the rigid support. The wiping or sealing face has a plurality of lips 93 and 94 separated by an annular slit 95. This face is then in turn spaced from the wall 91 by means of an annular groove 96. Likewise, the sealing face is flared outwardly to form the angle A as previously described.

Figure 16:
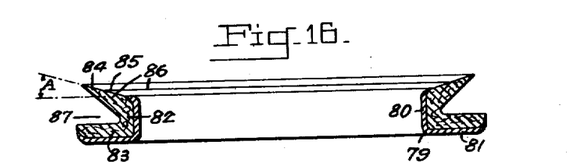
Fig. 16 is a transverse section of a seal having a rigid metallic supporting member arranged to be secured on its inner circumference having the flexible sealing faces arranged for contact with a radially disposed surface.
Figure 18:
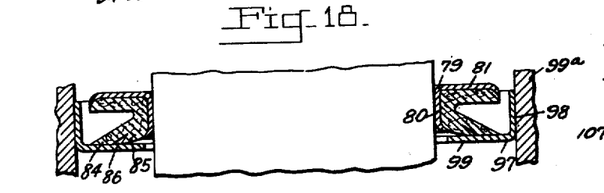
Fig. 18 is a fragmentary transverse sectional view illustrating the manner in which the seal shown in Fig. 16 can be associated with a special replaceable wearing member.

Fig. 18 discloses the use of the sealing member shown in Fig. 16 in association with a replaceable wearing member 97, which has an outer annular wall 98 and a radially inwardly extending flange 99. The sealing ring and the wearing member are inserted in an annular cavity provided by a member 99a which surrounds the shaft in spaced relation thereto. The inner wall 80 of the supporting base will bear snugly against the rotating shaft and will rotate the seal therewith, while the sealing lips 84 and 85 thereof will bear in an axial direction against the stationary flange 99. Here again, any fluid passing along the shaft will be diverted into the annular groove of the sealing member and thus exert additional pressure against the sealing lips and will thus prevent leakage of the fluid in the same manner as explained above with respect to the other forms of the seal.

Figure 19:
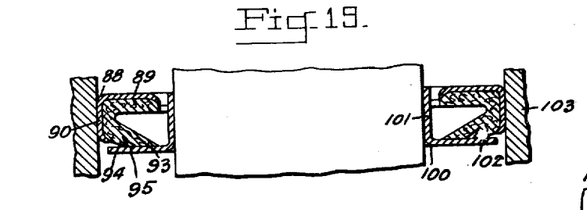
Fig. 19 is a fragmentary sectional view showing the manner in which the seal shown in Fig. 17 can be associated with a special replaceable wearing member.

In Fig. 19, I have shown a replaceable wearing member 100 having one wall 101 adapted to fit snugly over the shaft and rotate therewith and which has a radially outwardly extending flange 102. Here the cavity is provided between the outer member 103 and the shaft. The supporting ring of the seal is of the character shown in Fig. 17 and has its outer face 90 bearing against the inner surface of the member 103. The sealing lips 93 and 94 bear in an axial direction against the flange 102. The sealing ring in this case will remain stationary while the wearing surface rotates with the shaft. The ease with which the sealing ring and/or the replaceable wearing members can be removed after having become worn and replaced with new members will be obvious.

Figure 20:
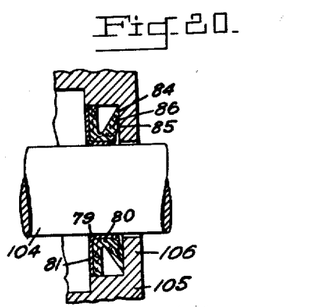
Figs. 20 and 21 are fragmentary sectional views showing the manner in which seals of the type shown in Figs. 16 and 17, respectively, can be mounted for sealing against a radially disposed face.
Figure 21:
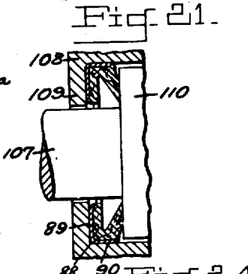

Figs. 20 and 21 respectively disclose other practical applications of the specific forms of rings shown in Figs. 16 and 17. Referring first to Fig. 20, there is disclosed a shaft 104 around which a member 105 is located, which has integral therewith an inwardly extending flange 106. The sealing ring shown in Fig. 16 is located within the retaining cavity between the member 105 and the shaft, the inner wall 80 thereof bearing snugly against the shaft and rotating therewith. The wiping and sealing lips 84 and 85 will bear against the inner surface of the radially extending flange 106 thus causing an effective seal.

In Fig. 21, a shaft 107 is surrounded by a member 108 having an inwardly extending flange 109. A radially outwardly extending wearing member or flange 110 is provided integral with the shaft 107 and the sealing ring shown in Fig. 17 is located within the retaining cavity. The sealing lips exert pressure in an axial direction against one side of the flange 110. It will be noted in this case that the wearing surface rotates with the shaft, while the sealing ring remains stationary. However, the same effective seal is maintained. In Fig. 20, the seal used will prevent fluid such as lubricating oil from passing outwardly and the seal as used in Fig. 21 is illustrative of the manner in which foreign materials such as mud and dirt are prevented from reaching the inside of the housing.

Figure 22:
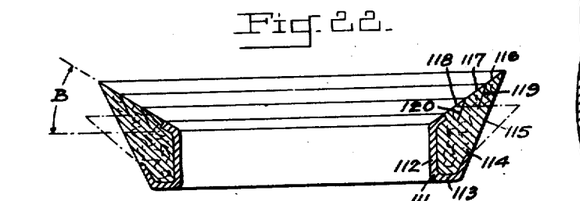
Fig. 22 is a transverse section of a still further modified form of sealing ring embodying the rigid supporting base and flexible sealing lips.

Referring now to Fig. 22, a slightly different form of sealing member is disclosed, wherein a very effective seal has been designed without the necessity of having two sides of the flexible member separated by an annular groove. All of Figs. 22 to 31, inclusive, refer to this general form of seal in association with various forms of replaceable wearing members, and illustrate the two specific types, wherein the seal may either rotate with the shaft or remain stationary with respect thereto. In Fig. 22, the rigid supporting member 111 is of a slightly different form than those heretofore described, in that it is provided with an axially extending wall 112 and a radially outwardly extending wall 113. Each of these walls terminate in outturned lips which grasp the main body portion 114 of the flexible portion of the seal. The flexible ring portion, however, is molded into a different shape but is still secured in substantially the same manner to the rigid support; that is, by means such as vulcanizing, or the like.

The flexible portion of the ring is substantially triangular in cross-section, as shown, and is provided with an outer angularly disposed peripheral wall 115 and a sealing wall or face adjacent thereto, which face is divided into a plurality of sealing lips 116, 117, and 118, separated from each other by slits of the character heretofore described and indicated at 119 and 120.

In viewing Fig. 22, it will be noted that the sealing face is angularly disposed with respect to a plane passing perpendicularly through the shaft on which the seal is to be mounted. This angle is indicated by the letter B and is preferably much larger than the angle A of the other seals described heretofore.

In this type of seal which is adapted to fit snugly around a shaft and rotate therewith, the sealing lips are adapted to bear against a radially disposed wearing surface or plate which may or may not be of a replaceable nature. It is preferable, however, that the wearing plate be replaceable as hereinafter described.

Figure 23:
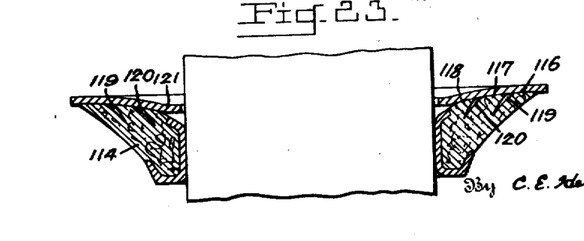
Fig. 23 is a transverse sectional view showing the manner in which the seal of Fig. 22 would appear in operating relation with a renewable wearing plate.

Fig. 23 discloses one application of this form of sealing member with respect to a replaceable wearing 121. In this instance, the plate will remain stationary while the sealing member rotates with the shaft and since the plate bears against the sealing wall with considerable pressure, the lips 116, 117 and 118 will tend to spread apart, this action being permitted by reason of the slits 119 and 120.

Figure 24:
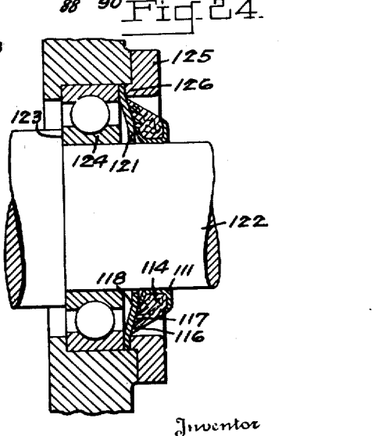
Fig. 24 is a fragmentary sectional view showing a practical application of the seal and wearing surface shown in Fig. 23.

A practical application of this type of seal and replaceable wearing member is shown in Fig. 24, wherein a shaft 122 is provided which may have a shoulder 123 thereon to provide an abutment for the bearing 124. After the bearing is in place as shown, the replaceable wearing plate 121 is placed over the shaft and will abut against the bearing. An annular member 125 having an axially disposed rib 126 thereon may then be located as shown so that the rib thereof will bear against a portion of the outer periphery of the plate 121, thus holding it in place. The sealing member, comprising the rigid support 111 and the resilient portion 114, is then fitted snugly over the shaft 122 and is pressed against the plate 121 with the sealing lips thereof in contact therewith. The sealing lips then spread apart due to such pressure and thereby provide an effective seal both against the entrance of foreign matter from the outside and leakage of fluid from the inside.

Figure 25:
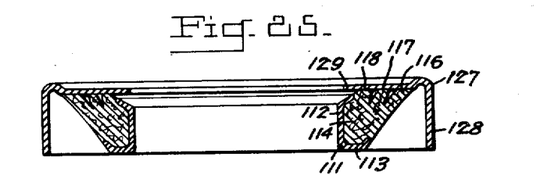
Fig. 25 is a transverse sectional view showing the seal of Fig. 22 in association with a modified form of wearing member.

Fig. 25 shows the same type of seal as that shown in Fig. 22 with its rigid supporting member 111 and the flexible portion 114 secured thereto but with a modified form of replaceable wearing plate. This wearing plate is indicated by the numeral 127 and is provided with an axially extending outer wall 128 and a flange 129, which extends radially inwardly. The sealing lips of the flexible portion of the seal are adapted to bear against the flange 129 and thus form an effective seal in the manner explained above.

Figure 26:
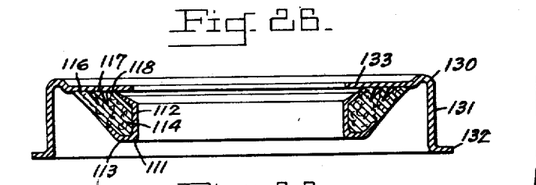
Fig. 26 is a transverse sectional view showing the seal of Fig. 22 associated with a still further modified form of wearing member.

Fig. 26 discloses the use of the same sealing ring in combination with a still further modified form of replaceable wearing plate. This plate, indicated by the numeral 130, has an axially extending outer wall 131 which terminates in an outwardly extending flange 132. Another wall or wearing face 133 extends radially inwardly as shown and is the wall against which the flexible sealing lips bear in order to form an effective seal.

Figure 27:
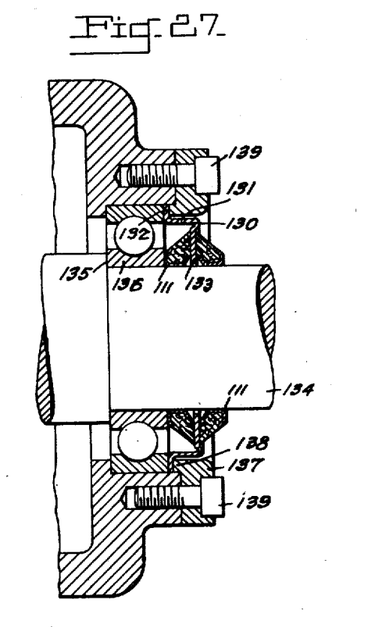
Fig. 27 is a fragmentary transverse sectional view of a practical application of the sealing member of Fig. 22 in association with a wearing member of the character shown in Fig. 26.

Fig. 27 discloses a practical application of the replaceable wearing plate 130 together with two of the sealing rings. In this application of the seal, a shaft 134 may be provided with an annular shoulder 135 against which a bearing 136 may abut. The wearing plate 130 is then passed over the shaft with its outwardly extending flange 132 abutting against the bearing 136. The outer wall 131 thereof will then extend outwardly away from the bearing and the wearing face 133 will extend radially inwardly toward the shaft. An external annular member 137 having a rib 138 extending from one side thereof will then be located as shown so that the rib will bear firmly against the flange 132 of the wearing plate. The various parts may then be secured together by means such as a bolt 139 in order to hold the plate against movement. The inner sealing ring 114 will have the flexible sealing lips thereof bear forceably against one side of the flange 133, while the outer sealing ring will be placed over the shaft in the opposite direction to enable the flexible sealing lips thereof to bear forceably against the outer side of the same flange. When two such similar sealing members are thus assembled, it will be clear that one will prevent leakage of lubricating fluid from the inside and the other will prevent entrance of foreign matter from the outside.

Figure 28:
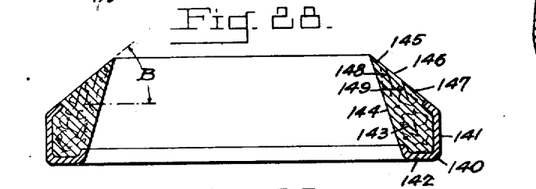
Fig. 28 is a transverse sectional view of a seal similar to that shown in Fig. 22, except that the rigid supporting member is adapted to be secured on its outer circumference.

Fig. 28 discloses a similar form of sealing ring except that it is adapted to remain stationary with respect to the rotating shaft which it surrounds. In this form of the invention a rigid supporting ring 140 is provided with an axially extending outer wall 141 and another wall 142 which extends radially inwardly. As in previous constructions, each of these walls terminates in an inturned lip which aids in retaining the body portion of a flexible ring 143. An inner wall 144 of the flexible ring 143 extends angularly inwardly while the sealing wall adjacent thereto is also angularly disposed with respect to a plane passing perpendicularly through a shaft which the ring surrounds at substantially the same angle B as mentioned above. Here again, the sealing wall is divided into a plurality of sealing lips such as at 145, 146 and 147 which may be separated from each other by means of slits 148 and 149.

Figure 29:
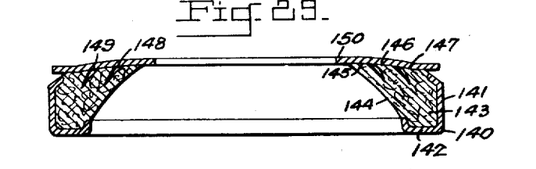
Fig. 29 is a transverse sectional view showing the sealing element of Fig. 28 in association with a renewable wearing member.

Fig. 29 discloses the appearance of the sealing ring of Fig. 28 when associated with a replaceable wearing plate such as shown at 150.

Figure 30:
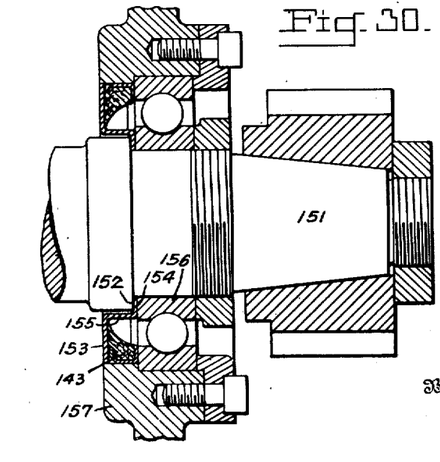
Fig. 30 is a fragmentary transverse sectional view showing a practical application of the seal shown in Fig. 28.

Fig. 30 illustrates one application of the type of sealing ring shown in Fig. 28, wherein a shaft 151 is provided at one point along its length with an annular shoulder 152. A replaceable wearing member having two radially extending flanges 153 and 154 connected by an axially extending wall 155 is then placed over the shaft so that the flange 154 abuts against the shoulder 152. A bearing 156 is then placed against the flange 154 as shown and may be held in place by means of an outer member 157 which may be secured in place by any desired means. The sealing ring as shown in Fig. 28 is disposed within the annular cavity made by the member 157, the outer wall thereof bearing snugly against the inner surface as shown in Fig. 30. The sealing lips of the flexible member 143 will then bear forceably against the outwardly extending flange 153 of the wearing member. In this case the wearing member will rotate with the shaft while the sealing ring remains stationary and the sealing effect is accomplished in the same manner as described above with respect to the other seals.

Figure 31:
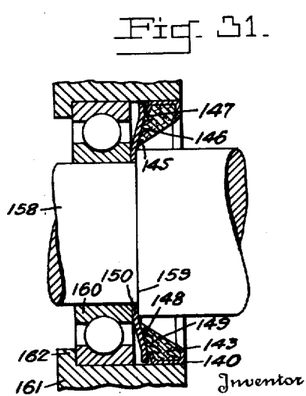
Fig. 31 is a fragmentary transverse sectional view disclosing a practical application of the seal and wearing member shown in Fig. 29.

Fig. 31 illustrates a practical application of the combination of parts shown in Fig. 29, wherein a shaft 158 has an annular shoulder 159 against which the replaceable wearing member 150 is located. A bearing 160 is then placed thereagainst and is held in place by means of an outer member 161, which has an inwardly extending flange 162 thereon. This flange then bears against one side of the bearing 160 as shown. A supporting ring 140 with its flexible ring 143 then bears against the inner annular surface of the member 161 to thus maintain the seal against rotation. The sealing lips 145, 146 and 147 bear forceably against the surface of the wearing plate 150 and will spread apart by reason of the slits 148 and 149, thus causing an effective seal against the entrance of foreign matter.

While all of the seals described herein with the various modifications shown embody specifically different forms of the invention, it will be clear that they perform the sealing operation by utilization of the same basic principles. The different forms are merely for the purpose of meeting the many different fluid seal problems of modern design and are all capable of functioning in the presence of variations in machining and misalignment of parts.

The composition of which the flexible ring of these seals is formed is an important consideration. They must first have oil resisting characteristics and simultaneously have wear and heat resisting qualities. The ordinary rubber or fibrous seals in use at the present time do not meet these specifications and therefore cannot be used. The preferred compound in general has been disclosed in my co-pending application, Serial Number 475,376, filed February 10, 1943, wherein it was explained that synthetics such as "Neoprene," "Duprene," "Thiokol," "Hycar," and the like, may be used. It is advisable, however, to substitute for a portion of the lampblack customarily used as a filler, an amount of a powdered anti-friction metal such as bronze or brass. This metal must be capable not only of resisting wear but also must have a characteristic which will permit it to act as a filler in the same manner as does the lampblack.

Up until the present time seals which have been used for purposes mentioned herein have embodied longitudinal or axially extending sealing faces. I have discovered, however, that radially disposed sealing faces, for example like those disclosed in Figs. 22 and 28, offer many advantages. One of these advantages is that the sealing quality of these radially disposed seals is not affected by the centrifugal forces rising out of high-speed rotation common to modern mechanisms. Furthermore by reason of their rotative forces, they have a tendency to throw out any accumulation of dirt or other foreign materials, a condition that frequently causes rapid wear and scoring of parts where seals used employ the longitudinal axially disposed sealing faces.

It will be clear from the foregoing description that many novel features of construction are here present in my invention and that numerous advantages are attained by the use thereof. Other forms of the invention, of course, may occur to those skilled in the art. However, it is not deemed that any such changes made in the the specific forms disclosed herein will depart from the spirit of the invention, provided, however, that such changes come within the scope of the appended claims.

The phrase "detachable wearing member" as employed in the ensuing claims is designed to designate a unit or assembly detachably secured to one of a plurality of relatively rotatable parts at a juncture such as to engage a relatively movable seal element whereby wear damage caused by said seal element will be absorbed by said unit or assembly and can be repaired by simply replacing said unit or assembly.

I claim:

1. In a mechanism of the class described having a rotating shaft therein and means providing an annular retaining cavity around said shaft, a sealing device mounted loosely within said cavity comprising a rigid supporting ring, an annular rib extending from one side of said ring in an axial direction, a flexible annular sealing face on an adjacent side of said ring, and a radially extending flange adjacent said ring, said ring and said flange having relative rotative movement, whereby fluid pressure against said ring will force the rib thereon against said flange in sealing relation thereto.

2. A sealing device of the class described comprising, a relatively rigid supporting ring having at least two walls, one extending generally axially and another generally radially, a flexible sealing member secured to said supporting ring and adapted to permit appreciable lateral displacement thereof, and a generally annular sealing rib on one of said walls of said supporting ring adapted to engage a suitable coacting surface.

3. In a seal construction of the general type described an annulus adapted to fit loosely about a member and laterally movably within a cavity, and an annular protuberance on one broad surface of said annulus adapted to sealingly engage abutment structure and to shift laterally thereon.

4. A seal construction of the type described comprising an annulus adapted to fit loosely about a member and laterally movably within a cavity, a flexible ring mounted at least in part on one broad surface of said annulus, a sealing surface on said flexible ring disposed in a generally axial direction but inclined thereto, adapted to engage a cooperating surface, and a generally annular protuberance on the other broad surface of said annulus adapted to sealingly engage abutting structure and to shift laterally thereon in accordance with the dictates of said sealing surface engaging said cooperating surface.

5. A sealing device of the type described comprising a support ring having a wall extending generally axially and another wall extending generally radially, a flexible ring mounted upon said support ring in engagement with said walls, said flexible ring having, in cross section, substantially four generally plane sides, two of which meet at an angle of appreciably less than 90 degrees, and at least one annular slit on one of said sides so meeting, the arrangement being such that said slitted side is adapted to angularly engage a cooperating member under substantial pressure whereby said side is flexed causing said slit to spread to provide a sealing lip and an accompanying material receiving cavity intermediate the peripheral edges of said side.

6. A sealing device for two relatively movable parts forming a cavity therebetween, comprising: annulus means adapted to fit loosely within said cavity; a flexible ring mounted on said annulus means and having an annular sealing lip, said ring having such diameter relative to one of said parts that said lip is deformed from its normal free position by interengagement with said one part when said sealing device is assembled with said parts, whereby said annulus means and said ring may shift with respect to the defining walls of said cavity and still provide a seal; and a continuous protuberance on one broad surface of said annulus means adapted to sealingly engage abutment structure.

7. A sealing device for two relatively movable parts forming a cavity therebetween, comprising: annulus means adapted to fit loosely within said cavity; a ring having a body portion formed of resilient material and mounted on said annulus means, said ring having an annular lip tapering in cross-section from said body portion to a feathered edge and providing a sealing surface which is adapted to lie along one of said parts, said lip having such diameter relative to said one part that said lip is deformed from its normal free position when said sealing device is assembled with said parts whereby said sealing surface bears against said one part with pressure created by the resiliency of said lip, yet providing for shifting of said annulus means with respect to the defining walls of said cavity, and said lip having slit means extending inwardly from said sealing surface, said slit means being constructed and arranged to open when said lip bears against said one part to form at least one additional sealing edge and collecting pocket spaced from said feathered edge; and a continuous protuberance on a broad surface of said annulus means adapted to sealingly engage abutment structure.

8. A sealing device, comprising: a rigid supporting ring having at least two walls, one extending axially and the other radially; a sealing ring, of flexible material, having a body portion, surfaces of which bear against surfaces of said walls, said sealing ring having an annular groove intermediate its inner and outer peripheries, providing an annular sealing lip adapted to engage a member to be sealed, said sealing lip having such diameter relative to said member that said sealing device may shift a predetermined amount transversely with respect to the axis of said member and still provide a seal; and said radially extending wall of said rigid supporting ring being provided with a continuous projection on the surface opposite to that engaged by said sealing ring and adapted to sealingly engage abutment structure.

9. A sealing device for two relatively movable parts, comprising: a replaceable wear member, adapted to be carried by one of said parts; sealing means, adapted to be carried by the other of said parts, having a body portion and a peripheral lip tapering in cross-section from said body portion to a feathered sealing edge and providing a sealing surface which includes said feathered edge and which bears against an adjacent surface of said replaceable wear member, and said lip having slit means extending from said sealing surface inwardly of said lip, said slit means being constructed and arranged to open under pressure applied to said lip to form at least one sealing edge and a collecting pocket spaced from said feathered edge.

JOSEPH F. JOY.

REFERENCES CITED

The following references are of record in the file of this patent:

UNITED STATES PATENTS

| Number | Name | Date |
|---|---|---|
| 2,049,063 | Hubbard | July 28, 1936 |
| 2,316,059 | Fretter | Apr. 6, 1943 |
| 2,172,325 | Victor et al. | Sept. 5, 1939 |
| 1,925,729 | Gits | Sept. 5, 1933 |

FOREIGN PATENTS

| Number | Country | Date |
|---|---|---|
| 481,331 | British | Mar. 9, 1938 |
| 528,208 | British | Oct. 24, 1940 |
| 492,954 | British | Sept. 29, 1938 |
| 694,689 | German | Aug. 6, 1940 |
| 452,201 | British | Aug. 18, 1936 |